(12) United States Patent
Gioia

(10) Patent No.: US 6,634,253 B2
(45) Date of Patent: Oct. 21, 2003

(54) DEVICE AND METHOD FOR COMPENSATING FOR DISPLACEMENT VARIATIONS BETWEEN DISSIMILAR GEAR SHIFTING LEVERS AND DERAILLEURS ON A BICYCLE

(76) Inventor: David M Gioia, 78 Pine Run Dr., Holland, PA (US) 18966-2232

( * ) Notice: Subject to any disclaimer, the term of this patent is extended or adjusted under 35 U.S.C. 154(b) by 0 days.

(21) Appl. No.: 09/978,246

(22) Filed: Oct. 17, 2001

(65) Prior Publication Data

US 2003/0073528 A1 Apr. 17, 2003

(51) Int. Cl.⁷ .............................. G05G 1/24; F16C 1/22
(52) U.S. Cl. ..................... 74/516; 74/502.6; 474/80; 474/82
(58) Field of Search ..................... 74/516, 517, 518, 74/502.2, 502.4, 502.6, 525; 403/52, 65, 69, 75; 474/82, 80, 78, 70

(56) References Cited

U.S. PATENT DOCUMENTS

| | | | | |
|---|---|---|---|---|
| 1,255,220 A | * | 2/1918 | Petry | 74/502.2 |
| 2,571,487 A | * | 10/1951 | Rolfe et al. | 74/502.2 |
| 3,736,800 A | * | 6/1973 | Gregory | 74/502.2 |
| 4,232,565 A | * | 11/1980 | Leonheart | 74/502.6 |
| 4,611,500 A | * | 9/1986 | Nagano | 74/502.2 |
| 4,877,112 A | * | 10/1989 | Malinowski | 74/502.2 |
| RE34,007 E | * | 7/1992 | Desenclos et al. | 74/502.6 |
| 5,447,475 A | * | 9/1995 | Socard | 74/502.2 |
| 5,579,872 A | * | 12/1996 | Chen | 74/502.2 |
| 5,878,626 A | * | 3/1999 | Gutierrez | 74/502.2 |
| 6,282,976 B1 | * | 9/2001 | Jordan et al. | 74/502.2 |

FOREIGN PATENT DOCUMENTS

FR           2700370 A1  *  7/1994  .............. F16C/1/12

* cited by examiner

*Primary Examiner*—Thomas R. Hannon
*Assistant Examiner*—Bradley J. VanPelt
(74) *Attorney, Agent, or Firm*—LaMorte & Associates

(57) ABSTRACT

A device and method of mechanically synchronizing the displacement requirements of a bicycle derailleur with the displacement created by an indexing gear shifter lever. The device includes a linkage element that is mounted to a bicycle between a gear shifter lever and a derailleur. The linkage element is mounted to the bicycle with a pivot hinge, wherein the linkage element is free to rotate about the pivot hinge. A cable from the gear shifter lever is attached to the linkage element at a first distance from the pivot hinge. A cable from the derailleur is attached to the linkage element at a second different distance from the pivot hinge. As the cable from the gear shifter is moved, the linkage element is rotated and that movement is transferred to the cable for the derailleur in a compensated manner.

12 Claims, 4 Drawing Sheets

DEVICE AND METHOD FOR COMPENSATING FOR DISPLACEMENT VARIATIONS BETWEEN DISSIMILAR GEAR SHIFTING LEVERS AND DERAILLEURS ON A BICYCLE

BACKGROUND OF THE INVENTION

1. Field of the Invention

The present invention relates to the systems on bicycles used to shift between gears, wherein such systems include index-type gear shifter levers and derailleur assemblies that are interconnected by cables. More particularly, the present invention relates to devices that can adapt the use of a set of indexing gear shifter levers with dissimilar derailleur assemblies on a custom built bicycle.

2. Prior Art Statement

Many bicycles contain a drive mechanism that has multiple gears. By shifting the bicycle's chain between the gears, the mechanical advantage between the pedals and the rear wheel of the bicycle can be selectively altered. Traditionally, the mechanism used to shift the bicycle's chain between different gears contains three interconnected assemblies. These assemblies are the gear shifter levers, the derailleurs and the cables that extend between the gear shifter levers and the derailleurs. The gear shifter levers are the levers that are positioned on or near the handlebars of the bicycle. These levers are moved by the person riding the bicycle, thereby providing manual shifting control to rider. The derailleurs are the mechanism that guide the bicycle chain onto different gears and compensate for slack in the chain as the chain moves between gears of different diameters. The cables are the elements that interconnect the shifter levers and the derailleurs and transfer mechanical movement between the gear shifter levers and the derailleurs. The cable is a direct mechanical drive. Consequently, if a gear shifter lever is used to move a cable $5/8^{th}$ of an inch, the cable transfers that $5/8^{th}$ of an inch of movement directly to a derailleur.

Because cables directly interconnect the gear shifter levers and the derailleurs, the gear shifter levers and the derailleurs must be coordinated into matched sets. For example, if an indexing-type gear shifting lever is designed to shift gears for every ¼ inch of movement it causes in a cable, a derailleur must also be designed to shift gears for every ¼ inch of movement it receives from the cable. If the gear shifter levers and the derailleurs are not coordinated, movement of the gear shifter levers between gears will not correspond to the proper derailleur movement required to shift gears. The result is that the desired gear shifting will not occur or may only partially occur, thereby creating chain slippage or chain chatter between gears.

Many bicycling enthusiasts customize their bicycles. Often gear shifter levers of a first type are desired to be used with derailleurs of a second type. However, since the gear shifter levers and the derailleurs are not compatible, the two assemblies cannot be used together. In the prior art, devices have been designed that mechanically alter the movement of a cable between a gear shifter lever and a derailleur. Such prior art devices are exemplified by U.S. Pat. No. 5,447,475 to Socard, entitled Device And Process For synchronous Control Of Bicycle Derailleurs. However, such prior art devices are intended to convert the movement of one cable into two cables, or visa versa. Such prior art systems do not enable dissimilar gear shifter levers and derailleurs to be used.

A need therefore exists for a device and method that can enable dissimilar indexing shifting levers and derailleurs to be used on a custom bicycle. This need is met by the present invention as described and claimed below.

SUMMARY OF THE INVENTION

The present invention is a device and method of mechanically synchronizing the displacement requirements of bicycle derailleurs with the displacement created by index-type gear shifter levers. The device includes a linkage element that is mounted to a bicycle between the gear shifter levers and the derailleurs. The linkage element is mounted to the bicycle with a pivot hinge, wherein the linkage element is free to rotate about the pivot hinge. A cable from each gear shifter lever is attached to a linkage element at a first distance from the pivot hinge. A cable from each derailleur is attached to a linkage element at a second different distance from the pivot hinge. As the cable from one gear shifter is moved, a linkage element is rotated and that movement is transferred to the cable for one derailleur. However, since the cable for the derailleur and the cable for the gear shifter lever connect to the linkage element at different points, only a percentage of the gear shifter lever's movement is transferred to the derailleur through the cables. The result is that different gear shifter levers and derailleurs can be mechanically synchronized to work together on the same bicycle.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE INVENTION

Although the present invention cable displacement compensation device can be used in any cable control system, the cable displacement compensation device is particularly well suited to use on a bicycle. As such, the present invention cable displacement compensation device will be described in an application where it is applied to a bicycle, in order to set forth the best mode contemplated for the invention.

Figure 1:
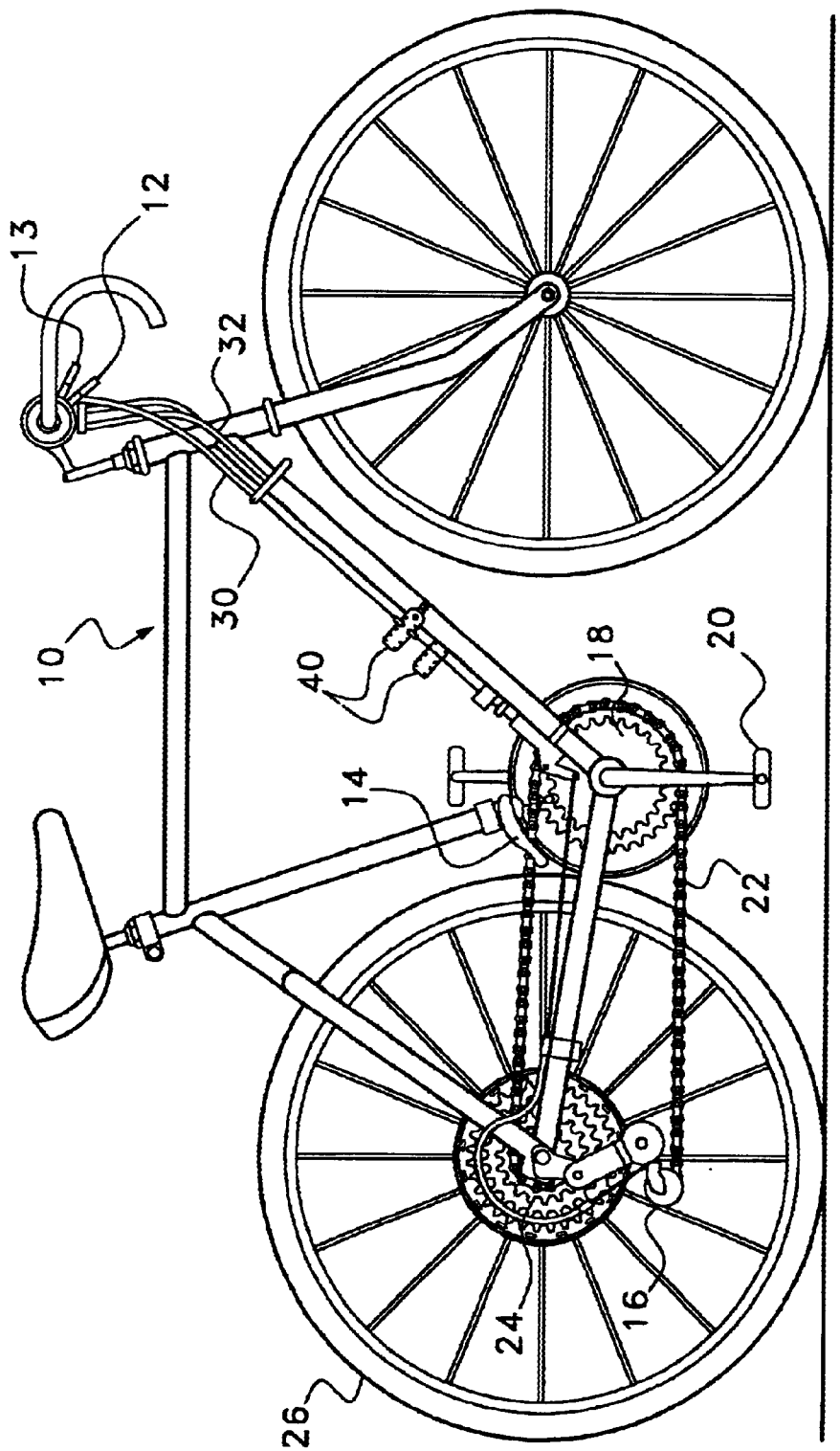
FIG. 1 is a side view of a bicycle containing two cable displacement compensation devices.

Referring to FIG. 1, a bicycle 10 is shown. The bicycle 10 has gear shifter levers 12, 13 positioned near the handlebars. It is these gear shifter levers 12, 13 that are manually moved by a person riding the bicycle 10 in order to selectively change the gear ratio of the bicycle 10. Two derailleur assemblies 14, 16 are present on the bicycle 10. The first derailleur assembly 14 is present over the chain wheel gears 18 that are affixed to the bicycle pedals 20. It is the function of the first derailleur assembly 14 to move the bicycle chain 22 between the different chain wheels 18 that are present. The second derailleur assembly 16 is present near the freewheel gears 24 on the rear wheel 26 of the bicycle 10. It is the function of the second derailleur assembly 16 to move the bicycle chain 22 between the different freewheel gears 24 that are present, while eliminating slack in the chain 22 as it moves between gears of differing diameters. The structures of such derailleur assemblies 14, 16 are well known in the prior art.

In the shown embodiment, the two derailleur assemblies 14, 16 are not designed to be used with the shifting levers 12, 13 present on that same bicycle 10. The derailleur assemblies 14, 16 are designed to shift gears every time a cable displaces one of the derailleurs 14, 16 by a predetermined distance, e.g. $1/16^{th}$ of an inch. However, the gear shifter levers 12, 13 are designed differently and are intended to cause a gear to shift upon a second displacement of a cable, e.g. $3/8$ inch. As such, the displacement created by the gear shifter levers 12, 13 to create a gear change does not match the displacement needed by the derailleurs 14, 16 to create that gear change.

On the bicycle, two gear shifter levers 12, 13 are present. One gear shifter lever 12 is intended to control the first derailleur assembly 14 and the other gear shifter lever 13 is intended to control the second derailleur assembly 16. A cable 30, 32 extends from each of the shifting levers 12, 13. However, the cables 30, 32 do not extend directly to the derailleur assemblies 14, 16. Rather, the two cables 30, 32 extend to cable displacement compensation devices 40 that are disposed on the bicycle 10 between the shifter levers 12, 13 and the derailleurs 14, 16.

Figure 2:
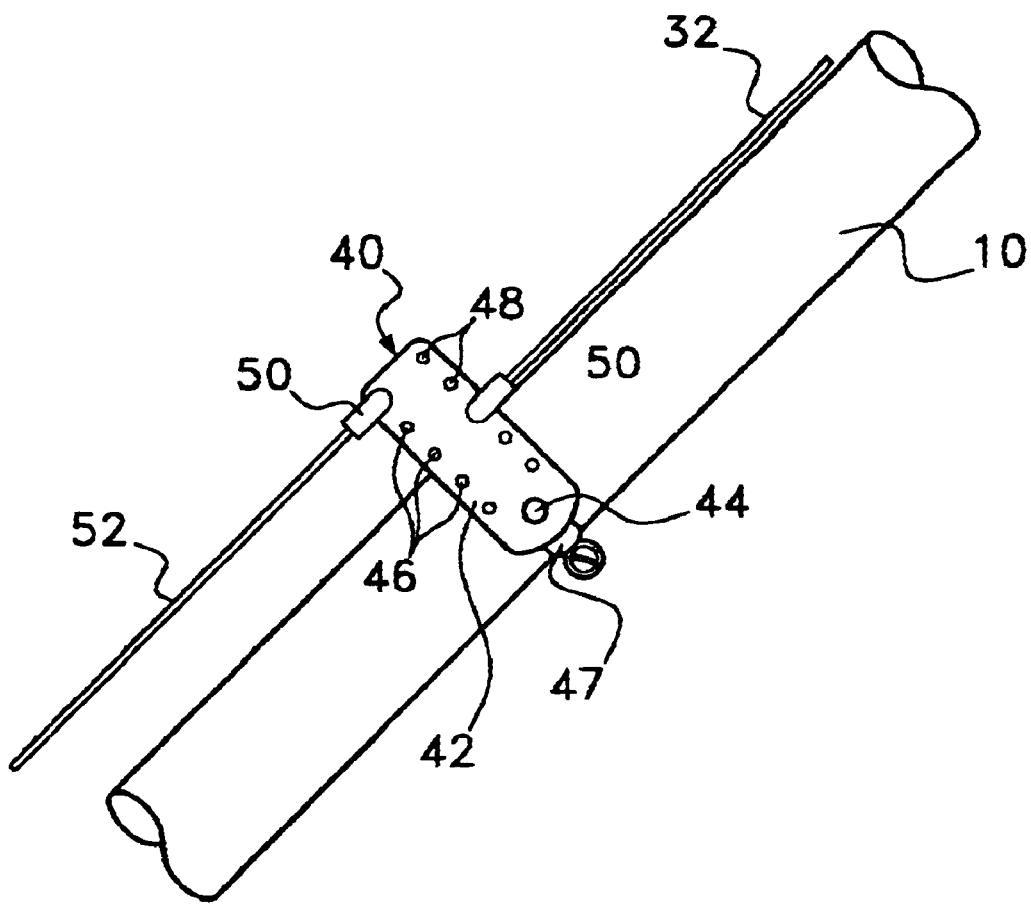
FIG. 2 is an enlarged view of a cable displacement compensation device.

Referring now to FIG. 2, it can be seen that a cable displacement compensation device 40 is comprised of a linkage element 42 that is connected to the frame of the bicycle 10 at a pivot joint 44. The pivot joint 44 can be directly mated with the frame of the bicycle 10. However, in the shown embodiment, the pivot joint 44 connects to a clamp 47 that can be selectively attached to the frame of the bicycle 10. In this manner, the cable displacement compensation device 40 can be mounted to a bicycle 10 without having to drill a hole in the frame of the bicycle 10.

The linkage element 42 is free to rotate about the pivot joint 44. Two sets of holes are present on the linkage element 42. One set of holes 46 is disposed upon the illustrated left edge of the linkage element 42, while the second set of holes 48 is disposed upon the illustrated right edge of the linkage element 42. Holes 46, 48 from the left edge set and the right edge set, respectively, are matched in pairs. Each pair of holes is a predetermined distance from the pivot joint 44. It will be understood that as the linkage element 42 rotates about the pivot joint 44, the movement along an arcuate path for each pair of holes differs. For any given rotational movement of the linkage element, the holes more distant from the pivot joint 44 will travel a further arcuate distance than will the holes closer to the pivot joint 44.

Cable terminations 50 are provided. The cable terminations 50 are designed to engage the end of a cable and join that cable to one of the holes on the linkage element 42. Using the cable termination 50, a cable can be selectively attached to any of the holes 46, 48 present on the linkage element 42.

The cable displacement compensation device 40 is placed on the bicycle 10 at some point in between the shift levers 12, 13 (FIG. 1) and the derailleurs 14, 16 (FIG. 1). Once a cable 52 from one of the derailleurs and a cable 32 from one of the gear shift levers are terminated with cable terminations 50, they are attached to the linkage element 42 of the cable displacement compensation device 40 at different points. In the shown embodiment, the cable 32 from the gear shifter lever is connected to a hole closer to the pivot joint 44 than is the cable 52 from the derailleur. As the gear shifter lever (FIG. 1) is manually manipulated, the cable 32 from the gear shifter lever either pushes or pulls the linkage element 42. This causes the linkage element 42 to rotate about the pivot joint 44. As the linkage element 42 moves about the pivot joint 44, the linkage element 42 either pulls or pushes the derailleur cable 52, thereby displacing that cable 52. Since the attachment point of the derailleur cable 52 is farther from the attachment point of the shifter cable 32, the displacement of the derailleur cable 52 differs from that of the shifter cable 32. If the shifter cable 32 is closer to the pivot joint 44 than is the derailleur cable 52, the derailleur cable 52 will be displaced farther than the shifter cable 32 for any movement of the linkage element 42. For example, if the shifter cable 32 is manually moved $1/8^{th}$ of an inch by a bicycle rider, such a displacement can result in a $3/16^{th}$ of an inch displacement in the derailleur cable 52. Alternatively, if the shifter cable 32 is farther from the pivot joint 44 than is the derailleur cable 52, the derailleur cable 52 will be displaced less than the shifter cable 32 for any movement of the linkage element 42. For example, if the shifter cable 32 is displaced $3/16^{th}$ of an inch by a bicycle rider, that displacement can result in a $1/8^{th}$ inch displacement in the derailleur cable 52.

The variation in displacement between the shifter cable 32 and the derailleur cable 52 can be selectively controlled by the placement of these cables in the holes in the lever linkage element 42. The farther the attachment points are from each other, the larger the differences in displacement. Conversely, the closer the attachment points on the linkage element 42, the less disparity in displacement will occur.

Thus, by using the cable displacement compensation device 40, a gear shifter lever (FIG. 1) that is calibrated with one displacement to change gears can be used with derailleurs (FIG. 1) that are calibrated with a different displacement to change gears.

Figure 3:
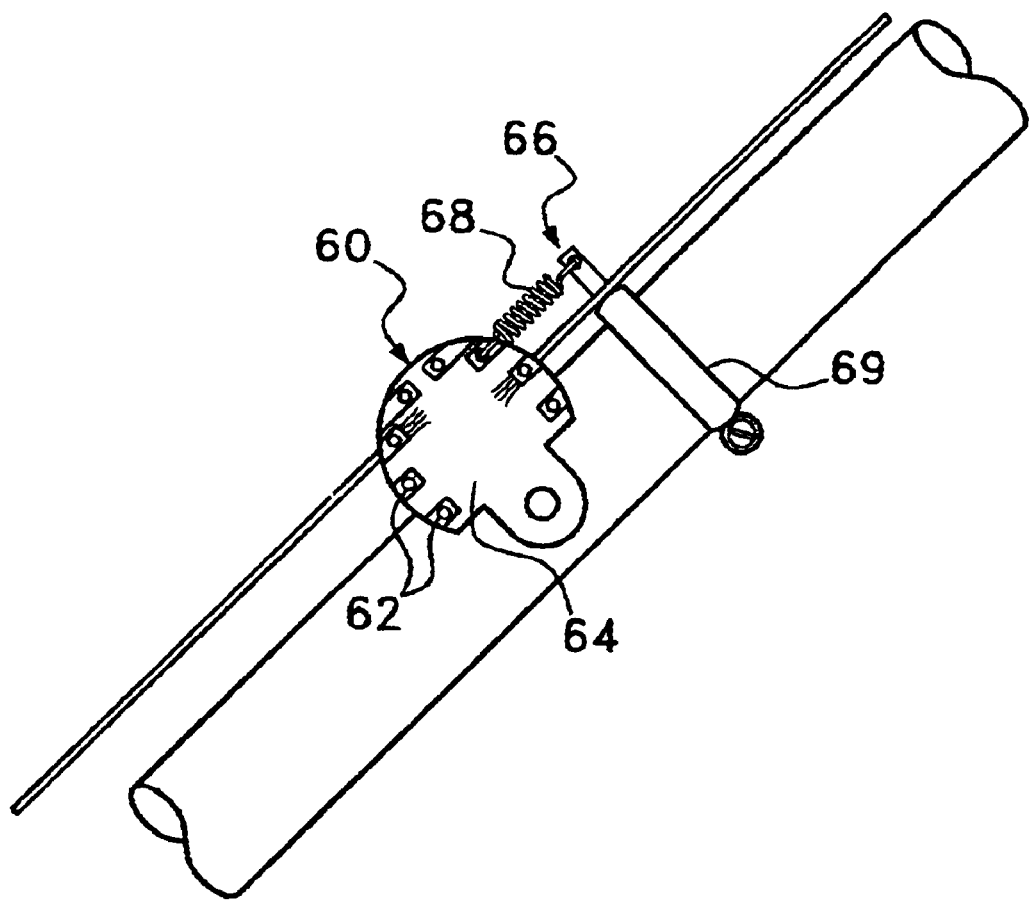
FIG. 3 is an alternate embodiment of a cable displacement compensation device.

Referring to FIG. 3, an alternate embodiment of the cable displacement compensation device 60 is shown. In this embodiment, cable terminations 62 are directly coupled to a linkage element 64 at different points. As such, the raw ends of cables need not be terminated prior to attachment to the device. Furthermore, the cable terminations 62 on the linkage element 64 are not linearly aligned. This is illustrated to point out that the linkage element 64 can have any configuration and the cable connection points on the linkage element 64 can be created in any pattern. Provided, that the holes in the linkage element 64 are at varying distance from the pivot joint 66 around which the linkage element 64 rotates.

Also illustrated in FIG. 3 is a derailleur return spring compensator assembly 66. Derailleurs typically have a return spring. The force applied by that return spring is designed to work in conjunction with a set of gear shifters. However, if a dissimilar set of gear shifters is used, the return spring in the derailleur may be strong enough to move the gear shifter out of gear. The derailleur return spring compensator assembly 66 is provided to stop this phenomenon from happening.

The derailleur return spring compensator assembly 66 is comprised of a spring element 68 and a base bracket 69. The base bracket 69 is mounted to the frame of the bicycle a short distance from the cable adjustment compensator 60. The spring element 68 is engaged with one of the cable terminations 62. The spring element 68 biases the linkage element 64 toward the gear shifter. As such, the derailleur return spring compensator assembly 66 opposes any return spring that may be present within a particular derailleur assembly.

In this manner, the return pull of a derailleur can be selectively corrected to match the needs of a particular gear shifter assembly.

Figure 4:
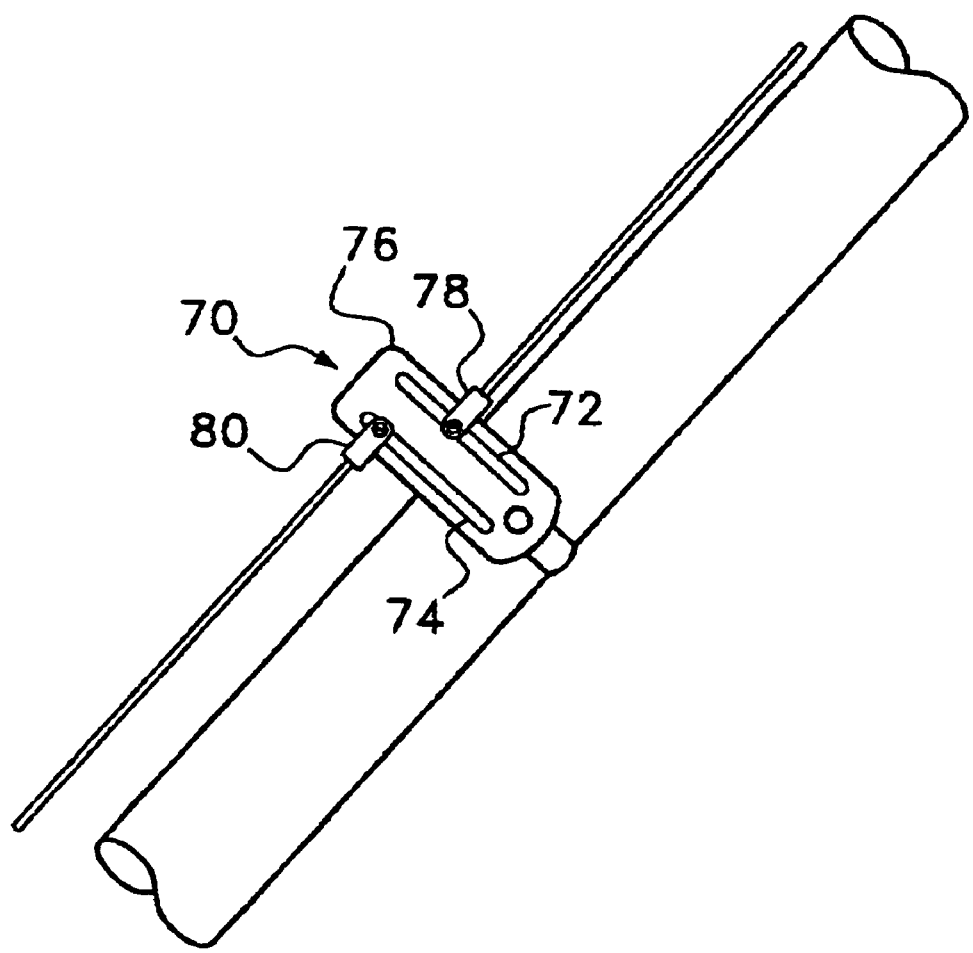
FIG. 4 is another alternate embodiment of a cable displacement compensation device.

Referring to FIG. 4, another alternate embodiment of the present invention cable displacement compensation device 70 is shown. This alternate embodiment is similar to the embodiment previously shown and described with reference to FIG. 2. However, in the shown embodiment elongated slots 72, 74 are formed on either side of the linkage element 76. Cable terminations 78, 80 are provided at the ends of the cables. The cable terminations 78, 80 can engage the elongated slots 72, 74 at any point along the length of those slots. As such, the position of the cable terminations 78, 80 are infinitely adjustable along the length of the slots 72, 74. As such, the transfer in cable displacement created by the device 70 can be finely adjusted if particularly finicky derailleurs with indexing shifters are used. Returning to FIG. 1, it will be understood that to use the present invention, shifter levers 12, 13 and derailleurs 14, 16 are provided on a bicycle 10. At least one cable displacement compensation 40 is then affixed to the frame of the bicycle 10 in between the shifter levers 12, 13 and the derailleurs 14, 16. At least one cable from the gear shifter levers 12, 13 and at least one cable from the derailleurs 14, 16 are connected to the cable displacement compensation device 40. The point of attachment of the cables synchronizes the needed displacements between each gear shifter lever 12, 13 and each derailleur 14, 16. The proper positions can be done via trial and error or through the use of printed instructions for known brands of shifter levers and derailleurs.

It will be understood that the embodiments of the present invention device described and illustrated are merely exemplary and a person skilled in the art can make many variations to the shown embodiment. All such alternate embodiments and modifications are intended to be included within the scope of the present invention as defined below in the claims.

What is claimed is:

1. In a bicycle having a frame, a chain, multiple gears upon which the chain can ride, a gear shifter for selecting one of the multiple gears, a first length of cable moved by the gear shifter, a derailleur for physically directing the chain onto a gear selected by the shifter, and a second length of cable that leads to the derailleur, a cable displacement compensation device, comprising:

a pivot joint attached to the frame of the bicycle;

a linkage element coupled to said pivot joint, said linkage element being free to rotate about said pivot joint;

wherein the first length of cable is coupled to said linkage element at a first point a first distance from said pivot joint; and wherein the second length of cable is coupled to said linkage element at a second point a second distance from said pivot point.

2. The device according to claim 1, wherein the gear shifter causes a first predetermined movement in the first length of cable when moved between consecutive gears and the derailleur requires a second predetermined movement in the second length of cable to move the chain between consecutive gears, wherein said linkage element converts the first predetermined movement in the first length of cable into the second predetermined movement in the second length of cable as said linkage element rotates about said pivot joint.

3. The device according to claim 2, further including a plurality of cable attachment points on said linkage element, wherein the first length of cable and the second length of cable selective attach said linkage element at different cable attachment points.

4. The device according to claim 2, further including a mechanical clamp for joining said pivot joint to the frame of the bicycle.

5. A bicycle assembly, including:

a bicycle with gears and a chain;

a first length of cable;

a gear shift lever attached to said first length of cable, wherein said gear shift lever a predetermined first movement in said first length of cable when said gear shift lever is manipulated between consecutive gear settings;

a second length of cable;

a derailleur attached to said second length of cable, wherein said derailleur requires a predetermined second movement in said second length of cable for said derailleur to move the chain between consecutive gears;

a cable displacement compensator disposed between said gear shift lever and said derailleur, said cable displacement compensator including a pivot joint and a linkage element coupled to said pivot joint;

wherein the first length of cable is coupled to said linkage element at a first point a first distance from said pivot joint; and wherein the second length of cable is coupled to said linkage element at a second point a second distance from said pivot point;

whereby said linkage element converts said first predetermined movement in said first length of cable into said second predetermined movement in the second length of cable as said linkage element moves about said pivot joint.

6. The assembly according to claim 5, further including a plurality of cable terminations, wherein said cable terminations are used to interconnect said first cable and said second cable to said linkage element.

7. The assembly according to claim 5, further including a mechanical clamp for joining said pivot joint to said bicycle.

8. On a bicycle having a gear shifter lever that causes a first cable displacement in a cable, when shifted between consecutive gears, and a cable controlled derailleur that requires a second cable displacement in a cable to change gears, a method of coordinating the first cable displacement created by the gear shifter lever to the second cable displacement required by a derailleur to properly shift gears, said method comprising the steps of:

providing a linkage element on the bicycle that is capable of at least partially rotating about a pivot point;

connecting said linkage element to said gear shifter lever with a first length of cable;

connecting said linkage element to said derailleur with a second length of cable, wherein said linkage element transfers a predetermined percentage of cable displacement from said first length of cable to said second length of cable.

9. The method according to claim 8, wherein said step of connecting said linkage element to said gear shifter lever with a first cable, includes connecting said first cable to said linkage element at a first distance from said pivot joint.

10. The method according to claim 9, wherein said step of connecting said linkage element to said derailleur with a second cable, includes connecting said second cable to said linkage element at a second distance from said pivot joint.

11. The method according to claim 10, wherein said first distance and said second distance are different.

12. The method according to claim 8, further including the steps of:

providing a return spring compensator;

connecting said return spring compensator to said linkage element, wherein said return spring compensator applied a predetermined bias to said second cable through said linkage element.

* * * * *